Patented June 29, 1954

2,682,526

UNITED STATES PATENT OFFICE 2,682,526

INTERLINKING POLYMERS WITH POLYLACTAMS

Paul J. Flory, Ithaca, N. Y., assignor, by mesne assignments, to The Goodyear Tire & Rubber Company, a corporation of Ohio No Drawing. Application July 28, 1950, Serial No. 176,534

7 Claims. (Cl. 260—75)

This invention relates to the preparation of polymers and more particularly to the preparation of polymers of high molecular weight by coupling or interlinking polymers of lower molecular weight by means of a particular type of interlinking agent.

In many instances, while it is relatively easy to prepare polymers of moderate molecular weight, it is much more difficult to prepare polymers of high molecular weight. Thus, in preparing superpolyamides or superpolyesters, and particularly in the latter case, it is often difficult to carry the reaction to completion. Thus, polymers of sufficiently high molecular weight to have the desired properties, for example for the production of fibers, plastics, films, etc., cannot easily be prepared.

One object of the present invention is to produce polyamides, polyesters and polyesteramides of high molecular weight more efficiently and in shorter times than by other available means. Another object of the invention is to facilitate the preparation of such polymers in instances where the preparation is difficult by other means. Another object is to prepare such polymers without producing undesired side reactions and degradation which attend some of the previously available methods. Other objects and advantages will appear as the description proceeds.

According to the practice of the invention, a polymer having a plurality of hydroxyl and/or amino radicals attached thereto is treated with an interlinking agent which is an N-acyl polylactam of a polycarboxylic acid, in which each of the carbonyl groups of the acyl radical is attached to the nitrogen atom of a lactam radical. The latter class of compounds is described in U. S. 2,303,177 to Schlack. The amino radicals in the polymers must contain at least one reactive hydrogen and are preferably primary amino. If the intermediate polymer contains only two reactive groups and the interlinking agent is bifunctional, the resulting high polymer will be linear, and hence thermoplastic. Crosslinked polymers are prepared by the use of a polymer and interlinking agent, one or both of which have more than two reactive groups.

The N-acyl polylactams, when derived from dicarboxylic acids, may be called N-acyl bis lactams and may be represented by the structural formula

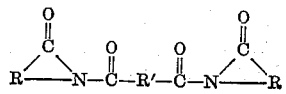

in which

is a lactam radical and

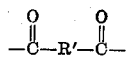

is a diacyl radical. More broadly, when the polycarboxylic acid has $x$ carboxyl groups, the products may be represented by the structural formula

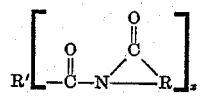

or

in which

is a lactam radical and

is a polyacyl radical and $x$ is 2 or more.

The polylactam interlinking agents may be prepared by condensing a lactam with the polyacyl chloride or polyacyl bromide of a polycarboxylic acid, the lactam being used in such proportions as to replace each of the halogens in the acyl halide. The reaction may be illustrated by the following equation, employing epsilon caprolactam and terephthaloyl chloride as representative reactants:

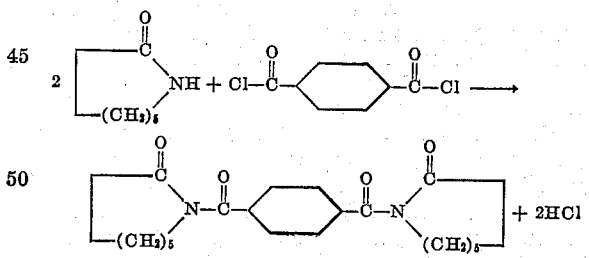

The preparation of such compounds is illustrated by the following representative example.

Example 1

To a solution of 22.6 grams (0.20 mol) of epsilon caprolactam in 200 cubic centimeters of dioxane were added a solution of 20.8 grams (0.102 mol) of terephthaloyl chloride in 100 cubic centimeters of dioxane and 20.2 grams (0.20 mol) of triethlamine in 50 cubic centimeters of dioxane. After these additions had been completed, the mixture was heated at 100° C. for 4 hours. It was then cooled and the triethylammonium chloride was filtered off. Concentration of the filtrate yielded a brown oil which on treatment with a mixture of ethyl acetate and hexane yielded a solid precipitate. After extraction with ethyl acetate, the precipitate was recrystallized from alcohol. The product, N,N'-terephthaloyl bis caprolactam, having the formula

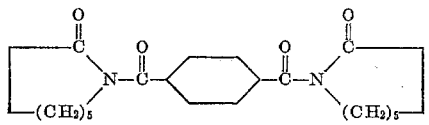

melted at 191–193° C. The calculated analysis for this compound is carbon, 67.42%, hydrogen, 6.74%. The values found by actual analysis were carbon, 67.01%, hydrogen, 6.84%.

Further examples of N-acyl poly lactams are N,N'-isophthaloyl bis epsilon caprolactam, N,N'-adipyl bis epsilon caprolactam, N,N'-adipyl bis valerolactam, N,N'-isophthaloyl bis valerolactam, N,N'-isophthaloyl bis butyrolactam, N,N'-terephaloyl bis butyrolactam N,N'-2,5-dichloroterephthaloyl bis caprolactam, N,N',N''-trimesyl tris epsilon caprolactam, the tetra valerolactam of 1,4,5,8-naphthalene tetracarboxylic acid, the tetra epsilon caprolactam of cyclohexanonetetrapropionic acid, the tetra epsilon caprolactam of dicyclohexanoneoctapropionic acid and the polycaprolactam of polyacrylic acid.

The interlinking process may proceed according to either or both of the following illustrative equations, in which —OH represents one end of a low molecular weight polymer having terminal hydroxyl groups and N,N'-terephthaloyl bis caprolactam is shown as a typical N-acyl polylactam of a polycarboxylic acid.

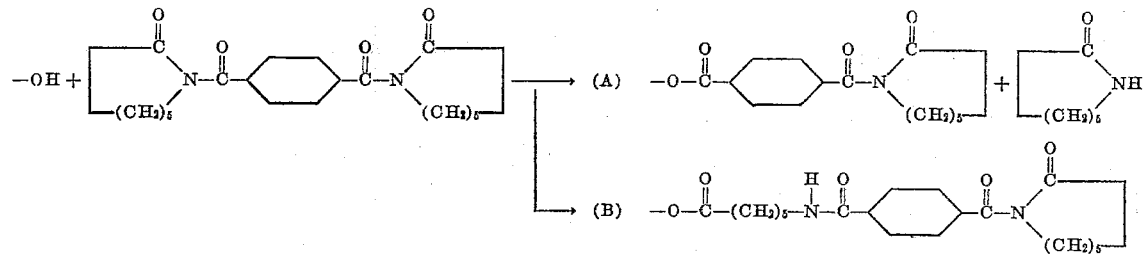

The mechanism of the reaction is not known for certain and it is possible that both of the indicated types of reaction occur. It appears that the reaction takes place at least in part according to Equation A since some free lactam is formed and can be recovered and identified. In the equations, reaction has been shown on only one end of each of the starting materials. Similar reaction can and, in practice, does take place on both ends of the molecules.

Although the invention is applicable to polymers containing two or more hydroxyl and/or amino terminal groups, the invention is particularly useful in the preparation of polyesters. The various superpolymethylene terephthalates and isophthalates derived from polymethylene glycols containing from two to ten methylene groups, including the ethylene, trimethylene, tetramethylene, pentamethylene, hexamethylene and decamethylene polyesters and copolyesters, are easily prepared by this method. Also, polyesters derived from the above acids and branched chain glycols as well as gylcols containing either oxygen or sulfur atoms as integral parts of the chain separating the two hydroxyl groups can be readily prepared by this method. Other useful polyesters are those derived from the various polymethylene glycols containing from two to ten carbon atoms and acids such as diphenoxyethane-4,4'-dicarboxylic acid, diphenoxypropane-4,4'-dicarboxylic acid, diphenoxybutane-4,4'-dicarboxylic acid, diphenoxypentane-4,4'-dicarboxylic acid, diphenoxyhexane-4,4'-dicarboxylic acid, diphenylmethane - 4,4' - dicarboxylic acid, diphenylbutane, 4,4'-dicarboxylic acid, naphthalene-1,5-dicarboxylic acid, naphthalene-2,6-dicarboxylic acid, naphthalene-2,7-dicarboxylic acid, 1,4-diphenoxybenzene 4',4''-dicarboxylic acid, 1,4-bis-(phenoxymethyl) benzene-4',4''-dicarboxylic acid, phenoxybenzene-4,4'-dicarboxylic acid, diphenylthioether-4,4'-dicarboxylic acid and diphenyl-4,4'-dicarboxylic acid.

As is well known in the art, linear aliphatic superpolyamides derived from diamines and dibasic acid in which the number of chain atoms in the polymeric repeat unit is greater than eight are usually fusible and thermoplastic and are useful in the form of fibers, bristles, monofilaments, films and plastics. These polymers are readily prepared by the methods of this invention. In addition, polyamides derived from aromatic dibasic acids and diamines or by the self-condensation of amino acids may readily be interlinked with N-acyl polylactams to produce superpolyamides.

A particularly important and valuable application of the invention is in the production of linear polymers of high molecular weight. For example, it is frequently difficult to obtain linear polyesters (of the glycol-dicarboxylic acid type) having molecular weights sufficiently high for optimum physical properties. Direct esterification of dicarboxylic acid and gylcol proceeds slowly, particularly when the molecular weight becomes moderately large. Reaction of the glycol with a dicarboxylic acid chloride is much faster but is inapplicable to certain types and in other cases it may be preferred to avoid use of the acid chloride because of unavailability or because of the deleterious effects of the hydrogen chloride released during the reaction. According to the present invention, a polyester or polyamide or polyester-amide of low or moderate weight having hydroxyl and/or amino end groups can be converted within a relatively short period of time to a polymer of high molecular weight.

Various methods are available for preparing low polymers with terminal hydroxyl and/or amino end groups. For example, a dicarboxylic acid can be reacted with more than an equivalent proportion of glycol and/or diamine. Small excesses produce larger polymer molecules while large excesses produce smaller molecules. Some polyesters can also be prepared by reacting an excess of glycol with an acid chloride. Polyamides can also be prepared by self-polymerization of a monoaminomonocarboxylic acid in the presence of a diamine. Polyesters can be prepared similarly from a monohydroxymonocarboxylic acid and a glycol. Polyesters can also be prepared by an ester interchange reaction between a glycol and an alkyl or aryl ester of a dicarboxylic acid. The particular method for forming the "intermediate" polymer having terminal amino and/or hydroxyl groups is not part of the present invention, which is directed to the interlinking of such polymers, however formed.

In order to produce polymers of high molecular weight or superpolymers, the number of hydroxyl and/or amino groups and the acylating groups arising from the N-acyl polylactam interlinking agent must be approximately equal. In the preparation of linear polymers, this will involve equimolecular proportions. If the average molecular weight of the intermediate polymers is known, the approximate amount of interlinking agent can be calculated. In practice, however, it is frequently desirable to establish the optimum amount of interlinking agent by empirical methods. Because of the difference in size of the molecules of "intermediate" polymer and interlinking agent, the proportion by weight of the interlinking agent will be small. If the molecular weight of the polymer to be interlinked is low, larger amounts of the relatively expensive interlinking agent will be required. The interlinking agent may be charged into a reactor containing well-stirred molten polymer and the reaction continued at temperatures above the melting point of the polymer. After the initial reactions have been completed, the liberated lactam may be removed under reduced pressure and the resultant superpolymer removed by any suitable means. Alternatively, the interlinking agent may be added portionwise with complete reaction before the next addition. Under these conditions, the addition of an amount of N-acyl polylactam in excess of the calculated amount will not be harmful providing the molecular weight of the polymer at the end of the previous reaction period was sufficiently high to give the desired properties. An excellent method of carrying out the reaction is to add the N-acyl polylactam or its solution to a solution of the polymer in a nonreactive solvent. Under these conditions, thorough mixing is assured. The reaction can be completed at an elevated temperature. The polymer may be recovered either by distillation of the solvent or by precipitation of the polymer in a nonsolvent.

The practice of the invention in the preparation of linear polymers is illustrated by the following examples.

*Example 2*

A low viscosity decamethylene sebacate polymer was prepared by reacting sebacyl chloride with an 8.0% molar excess of decamethylene glycol in o-dichlorobenzene solution. After two hours at reflux, the solvent was distilled off under reduced pressure. The residual polymer had a melt of viscosity of 6.33 poises at 109° C. From this viscosity, the molecular weight was calculated to be 3,200.

A small portion (4.148 grams) of this low molecular weight polymer was reacted with 0.459 gram of N,N'-isophthaloyl-bis-caprolactam by refluxing in o-dichlorobenzene for one and a half hours. After removal of the solvent, the residual polyester had a melt viscosity of 3,246 poises at 109° C. Fibers drawn from the melt cold drew readily.

*Example 3*

A low molecular weight polyamide was prepared by heating 4.49 grams of sebacic acid and 4.09 grams (7.0% excess) of decamethylene diamine at 218° C. for two hours, with pure nitrogen passing through the melt. At the end of this time, the viscosity had reached a fairly constant value of 70 poises, corresponding to a molecular weight of about 6,000. Four hundred and forty-three thousandths gram of N,N'-terephthaloyl-bis-caprolactam was then added to the polymer. On heating at 255° C., the viscosity rose very rapidly and within a half hour reached a value in the vicinity of 30,000 poises.

*Example 4*

A low molecular weight ethylene terephthalate polymer was prepared by a magnesium catalyzed ester interchange reaction from 15.0 grams of dimethyl terephthalate and 7.275 grams of ethylene glycol. The reactants were heated at 197° C. for one and a half hours with nitrogen stirring and the excess glycol was then removed by heating in a vapor bath maintained at 280° C. for one and a half hours. The very low polymer was then heated at 280° C. in vacuo and ethylene glycol gradually distilled away from the molten polymer. The viscosity of the polymer continued to rise under these conditions, the melt viscosity after 1.33 hours at this temperature being 20.7 poises, corresponding to an estimated molecular weight of 4,800. The cooled polymer was crushed into fine pieces and 4.5 grams of this polymer and 0.334 gram of N,N'-isophthaloyl-bis-caprolactam were added to 15 milliliters of o-dichlorobenzene. This mixture was heated at reflux for two hours and the solvent distilled off. After heating in vacuo at 280° C. for one hour, the melt viscosity of the polymer was 2,240 poises. The molten polymer cooled to a light yellow crystalline solid, melting at 252-255° C. Fibers formed from the molten polymer would cold draw and were pliable and strong.

*Example 5*

To prepare a low molecular weight tetramethylene terephthalate polymer with hydroxyl end groups, 40.56 grams of terephthaloyl chloride in 120 milliliters of o-dichlorobenzene were reacted with 18.73 grams of tetramethylene glycol. The reactants were heated at 61° C. for two hours with agitation by a stream of dry nitrogen and were then refluxed for an additional four hours. The solvent was removed by distillation, the last traces being removed by heating in vacuo at 241° C. for one hour. The polymer had a melt viscosity of 60 poises at 241° C. and cooled to a light cream colored crystalline solid. To 4.86 grams of the crushed polymer were added 0.2172 gram of N,N'-isophthaloyl-bis-caprolactam and 15 milliliters of o-dichlorobenzene and the mixture was heated to reflux under dry nitrogen for six hours. The solvent was then removed by distillation, the last traces of solvent, as well as a few bubbles, being removed by heating in vacuo at 241° C. for one hour. The resulting polymer had a melt viscosity of 2,300 poises at 241° C.

Example 6

Low molecular weight hexamethylene terephthalate was prepared by condensing 3.76 grams of hexamethylene glycol with 6.091 grams of terephthaloyl chloride in the presence of 18 milliliters of o-dichlorobenzene. The condensation was initially carried out at 61° C. for one hour and then at reflux for two and a half hours under dry nitrogen. The polymer was isolated by distillation of the solvent and was heated under vacuum at 218° C. for one hour to remove the last traces of solvent and to free the molten polymer of entrapped gases. The viscosity of the polymer was 16.15 poises at this temperature and the calculated molecular weight (assuming a glycol loss of 0.4 mol per cent) was 4,460. To 7.44 grams of the above polymer dissolved in 18 milliliters of o-dichlorobenzene was added 0.5931 gram of N,N'-terephthaloyl-bis-caprolactam and the mixture was refluxed for two hours under dry nitrogen. Isolation of the polymer was accomplished by distillation, the polymer being freed of traces of solvent by heating in vacuo at 218° C. for two hours. The resulting polymer had a melt viscosity of 1,300 poises and, on cooling, was a light brown crystalline solid.

Example 7

In the preparation of hydroxyl terminated decamethylene terephthalate intermediate polymer, 37.64 grams of decamethylene glycol were reacted with 40.61 grams of terephthaloyl chloride. The condensation was carried out in the absence of a solvent by heating the reactants at 110° C. for half an hour and then increasing the temperature to 218° C. for one and a half hours under atmospheric pressure and finally heating for one and a half hours at 218° C. under vacuum. The polymer had a melt viscosity of 10.83 poises and a calculated molecular weight of 3,950. The reaction between the interlinking agent and the hydroxyl terminated polymer was carried out in the melt in the absence of solvent. To 4.92 grams of the polymer in a reaction tube having a diameter of 22 millimeters was added 0.4414 gram of N,N'-terephthaloyl-bis-caprolactam and the entire assembly was carefully flushed with dry nitrogen. The tube was heated in a 218° C. vapor bath and solution of the interlinking agent in the polymer was completed within five minutes. The viscosity of the melt rose rapidly and in two and a half hours the viscosity had reached 12,100 poises at 218° C. On cooling, a light colored crystalline solid resulted. In the upper end of the reaction tube a considerable amount of sublimate was observed. This sublimate melted at 69-71° C., indicating that caprolactam is one of the products of the reaction.

Example 8

In order to prepare a low molecular weight tetramethylene isophthalate suitable for interlinking, 19.805 grams of tetramethylene glycol were reacted with 42.493 grams of isophthaloyl chloride in the presence of 120 milliliters of o-dichlorobenzene. After carefully adjusting the flow of dry nitrogen to ensure adequate stirring, the reactants were heated at 61° C. for two hours and then under reflux for four and a half hours. The solvent was removed by distillation and, after heating for one hour at 218° C., the polymer was free of solvent and bubbles. The melt viscosity of this polymer was 15.1 poises at 218° C. and the calculated molecular weight was 7,000.

The interlinking reaction was carried out by reacting 5.005 grams of the above polymer with 0.2239 gram of N,N'-isophthaloyl-bis-caprolactam in the presence of 15 milliliters of o-dichlorobenzene at reflux temperature for six hours. After removing the solvent by distillation and freeing it of the last traces of solvent and all bubbles by heating for two and a half hours at 218° C., the melt viscosity of the polymer was 3,320 poises. The cooled polymer was a light yellow solid.

Cross-linked polymers having properties similar to those of a vulcanized rubber or a gelled or thermoset resin can be prepared by the process of the invention when either or both the N-acyl polylactam and the "intermediate" polymer contain more than two functional groups. For example, such products result when a linear polyester or polyamide or polyesteramide having hydroxyl and/or amino end groups is treated with an N-acyl polylactam compound having three or more lactam groups per molecule. Another method for preparing cross-linked or network polymers is by reacting a nonlinear polyester, polyamide or polyesteramide containing more than two amino and/or hydroxyl groups per molecule with an N-acyl polylactam containing at least two lactam groups per molecule. Suitable nonlinear polymers may be prepared, for example, by condensing a glycol, dibasic acid and a polycarboxylic acid having a functionality greater than two or by condensing a glycol, a polyhydric alcohol having a functionality greater than two and a dicarboxylic acid. In preparing these initial polymers, it is preferred to use a sufficient amount of glycol to prevent gelation of the composition of the esterification process or, if gelation does occur, the condensation preferably should not proceed to an extent beyond the gelation point such that the product cannot be milled or molded or otherwise processed in the subsequent interlinking reaction. The proportion of the glycol required for a given amount of the polyfunctional compound may be determined by trial or it may be computed approximately from theory. (See JACS, volume 63, page 3083 (1941).) Further examples of suitable polymers having a functionality greater than two are those of the "multichain" type prepared by reacting a relatively small amount of an alcohol containing at least three reactive hydroxyl groups with a relatively large amount of a monohydroxy monocarboxylic acid or by reacting a relatively small amount of a polyamino compound containing at least three reactive amino groups with a relatively large amount of a monoaminomonocarboxylic acid or a monohydroxymonocarboxylic acid. The nonlinear, preferably thermoplastic, polymer prepared according to one of these methods, or any other method, is then treated with a polylactam compound having a functionality of at least two. It is preferred to use a proportion of this compound which is approximately equivalent to the hydroxyl or amino groups present in the polymer. This polylactam compound is incorporated by stirring, milling or by dissolving in a suitable solvent. This mixture can be molded or cast into the form of the final object and reaction effected by heating at elevated temperature.

Also included in the scope of this invention is the treatment of chain polymers having multiple hydroxyl groups along the chain with bis- or other poly-lactam compounds. Thus, polyvinyl alcohol or copolymers containing vinyl alcohol units may be converted to thermoset products by treating with polylactam compounds having a functionality of two or more. Cellulose and derivatives thereof which contain free hydroxyl groups may be similarly treated.

The polylactam compound is preferably used in an amount approximately in stoichiometric equivalence with the reactive hydroxyl and/or amino groups in the polymer.

Thus, the invention includes the conversion of thermoplastic polymers having at least two hydroxyl and/or amino groups per molecule to "vulcanized" or thermoset compositions through treatment with polylactam compounds as described above. If the initial polymer molecules contain only two hydroxyl and/or amino groups per molecule, as in the case of linear polymers terminated with hydroxyl and/or amino groups, a polylactam compound containing at least three lactam groups must be used in order to achieve cross-linking. If the number of available hydroxyl and/or amino groups per molecule is three or greater, either the bis- or higher polylactam compounds may be used.

The practice of the invention in preparing cross-linked polymers is illustrated by the following representative example.

Example 9

A low molecular weight polymer was prepared by reaction of 6.651 grams of decamethylene glycol, 0.353 gram of pentaerythritol and 5.845 grams of adipic acid at 160° C. with nitrogen stirring for sixteen hours. The melt viscosity of the low viscosity polymer was 24.05 poises at 109° C.

Reaction of this polymer (4.21 grams) with N,N'-isophthaloyl-bis-caprolactam (0.31 gram) was carried out in o-dichlorobenzene. On refluxing, the solution thickened rapidly, and after 45 minutes, insoluble gel was formed. The solvent was distilled off under reduced pressure. The residual polymer did not flow at temperatures below the range of thermal decomposition. The product was insoluble in chloroform, toluene, o-dichlorobenzene and diphenyl ether.

While certain representative embodiments and details have been shown for the purpose of illustrating the invention, it will be apparent to those skilled in this art that various changes and modifications may be made therein without departing from the spirit or scope of the invention.

I claim:

1. A method for increasing the molecular weight of a preformed polyester containing, as the only reactive groups therein, at least two hydroxyl radicals which comprises mixing and reacting a major proportion by weight of said preformed polyester with a minor proportion by weight of a polylactam in which at least 2 lactam radicals are linked through their nitrogen atoms by an acyl radical of a polycarboxylic acid, each of the carbonyl groups of the acyl radical being thus attached to a lactam radical and said polylactam being free from reactive substituents.

2. A method according to claim 1 in which the polylactam is used in an amount equivalent to the hydroxyl radicals in the polyester.

3. A method according to claim 2 in which the polylactam is a bis lactam in which the two lactam radicals are linked through their nitrogen atoms by an acyl radical of a dicarboxylic acid.

4. A method according to claim 3 in which the polyester is a linear polyester having, as the only reactive groups therein, terminal hydroxyl radicals.

5. A method according to claim 4 in which the polyester is a polymethylene terephthalate in which the polymethylene radical contains from two to ten methylene groups.

6. A method according to claim 5 in which the polylactam is N,N'-terephthaloyl bis caprolactam.

7. A method according to claim 4 in which the polyester is a polymethylene isophthalate in which the polymethylene radical contains from two to ten methylene groups.

References Cited in the file of this patent

UNITED STATES PATENTS

| Number | Name | Date |
| --- | --- | --- |
| 2,241,321 | Schlack | May 6, 1941 |
| 2,277,152 | Schlack | Mar. 24, 1942 |
| 2,303,177 | Schlack | Nov. 24, 1942 |

FOREIGN PATENTS

| Number | Country | Date |
| --- | --- | --- |
| 890,287 | France | Nov. 2, 1943 |
| 57,731 | Holland | June 15, 1946 |